United States Patent [19]
Weng

[11] Patent Number: 6,036,755
[45] Date of Patent: Mar. 14, 2000

[54] WATER FILTERING TYPE AIR CLEANING UNIT

[75] Inventor: Kuo-Liang Weng, Taichung, Taiwan

[73] Assignee: Yiue Feng Enterprise Co., Ltd., Taichung, Taiwan

[21] Appl. No.: 09/099,148

[22] Filed: Jun. 18, 1998

[51] Int. Cl.[7] ................................................. B01D 47/00
[52] U.S. Cl. ............................. 96/223; 96/233; 96/242; 96/249; 96/266; 96/276; 96/294; 96/296; 96/299
[58] Field of Search ............................. 96/223, 228, 233, 96/242, 247, 249, 250, 266, 274, 276, 277, 290, 294, 296, 299, 360

[56] References Cited

U.S. PATENT DOCUMENTS

| | | | |
|---|---|---|---|
| 1,568,717 | 1/1926 | Braemer | 96/266 X |
| 1,899,017 | 2/1933 | Dauphinee | 96/299 X |
| 1,913,885 | 6/1933 | Jordahl | 96/233 |
| 2,057,579 | 10/1936 | Kurth | 96/233 |
| 2,143,979 | 1/1939 | Feinberg | 96/277 |
| 2,262,542 | 11/1941 | Bahnson, Jr. | 96/266 X |
| 2,387,473 | 10/1945 | Spitzka | 96/233 |
| 2,514,720 | 7/1950 | Rennels | 96/242 |
| 2,703,228 | 3/1955 | Fleisher | 96/249 X |
| 3,398,510 | 8/1968 | Pennington | 96/294 X |
| 3,505,989 | 4/1970 | Truhan | 96/223 X |
| 3,751,885 | 8/1973 | McNeely | 96/242 |
| 3,960,526 | 6/1976 | Andrews | 96/228 |
| 4,200,442 | 4/1980 | Willot | 96/223 X |
| 4,274,845 | 6/1981 | Howard | 96/228 |
| 5,389,120 | 2/1995 | Sewell et al. | 96/233 |

*Primary Examiner*—Robert H. Spitzer
*Attorney, Agent, or Firm*—Rosenberg, Klein & Lee

[57] ABSTRACT

A water filtering type air cleaning unit includes a housing having an upper side defining an air draining conduit and a lower side defining an air inlet conduit, a water permeable air filtering device mounted in the air draining conduit and including a plurality of stacked air filtering pipes, a water permeable disk mounted on a top edge of the water permeable air filtering device, a cold water heat exchanging device mounted in the air inlet conduit and including a cold water inlet and a cold water outlet connected with the water permeable disk, a water pump mounted in the air inlet conduit and connected with the cold water inlet, a water tank mounted in the air inlet conduit and connected with the water permeable air filtering device and the water pump, a natural convention device mounted in the housing and including a plurality of closed circulating pipes each filled with a refrigerant, and a vent mounted in the housing and including an upper side formed with an air outlet and an air inlet.

12 Claims, 7 Drawing Sheets

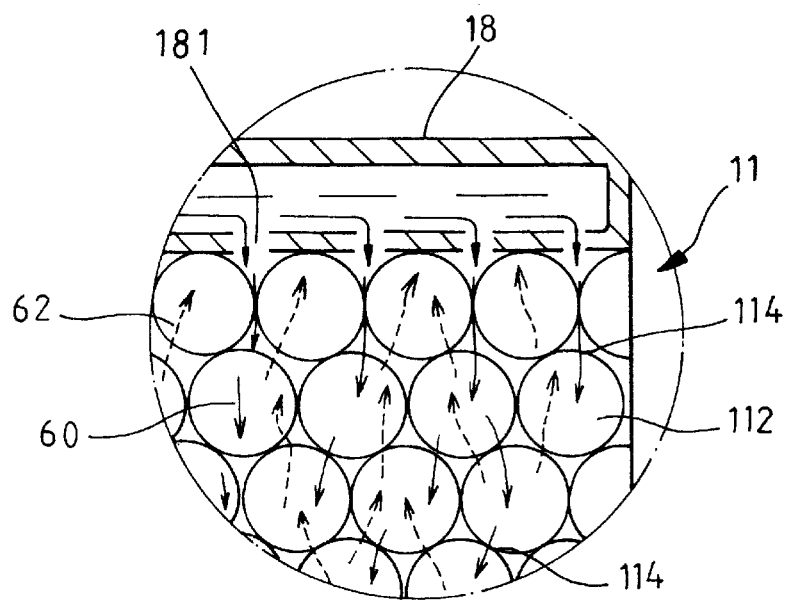
F I G. 2
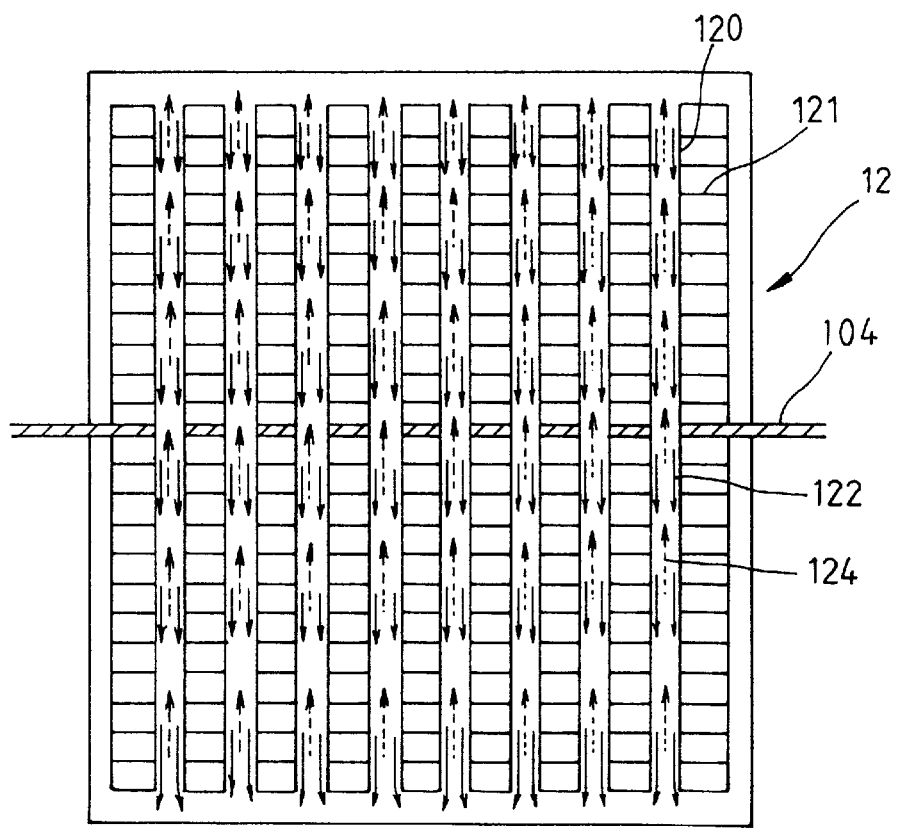
F I G. 3

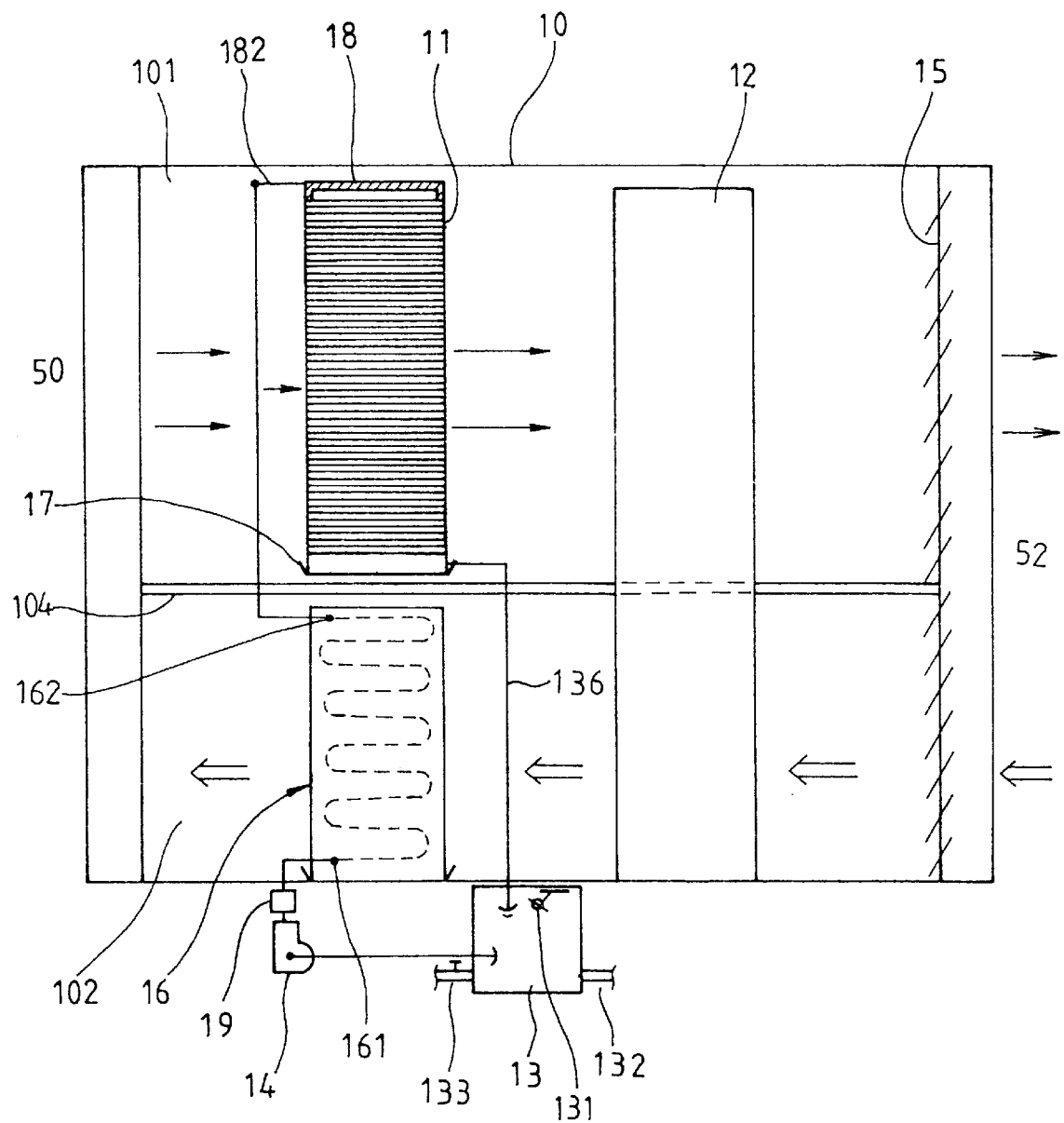
F I G. 4

WATER FILTERING TYPE AIR CLEANING UNIT

BACKGROUND OF THE INVENTION

1. Field of the Invention

The present invention relates to an air cleaning unit, and more particularly to a water filtering type air cleaning unit.

2. Description of the Related Prior Art

Waste or dirty air will be drained from a room or an operating space such as a chemical factory and the like into surroundings by means of the operation of air conditioning equipments. Therefore, it is necessary to prevent waste air from being exhausted into surroundings. The present invention has arisen to solve the above-described problem.

SUMMARY OF THE INVENTION

The primary objective of the present invention is to provide water filtering type air cleaning unit functioning to clean air and to save energy consumption.

In accordance with one aspect of the present invention, there is provided a water filtering type air cleaning unit comprising a housing including an upper side defining an air draining conduit and a lower side defining an air inlet conduit, a water permeable air filtering device mounted in the air draining conduit and including a plurality of stacked air filtering pipes, a water permeable disk mounted on a top edge of the water permeable air filtering device, a cold water heat exchanging device mounted in the air inlet conduit and including a cold water inlet and a cold water outlet connected with the water permeable disk, a water pump mounted in the air inlet conduit and connected with the cold water inlet, a water tank mounted in the air inlet conduit and connected with the water permeable air filtering device and the water pump, a natural convention device mounted in the housing and including a plurality of closed circulating pipes each filled with a refrigerant, and a vent mounted in the housing and including an upper side formed with an air outlet.

Further objectives and advantages of the present invention will become apparent after a careful reading of the detailed description with appropriate reference to the accompanying drawings.

BRIEF DESCRIPTION OF THE DRAWINGS

FIG. 2 is a cross-sectional view along line 2—2 of FIG. 1;

FIG. 3 is a cross-sectional view along line 3—3 of FIG. 1;

FIG. 4 is a front plan view of a water filtering type air cleaning unit in accordance with another embodiment of the present invention;

DETAILED DESCRIPTION OF THE PREFERRED EMBODIMENTS

Figure 1:
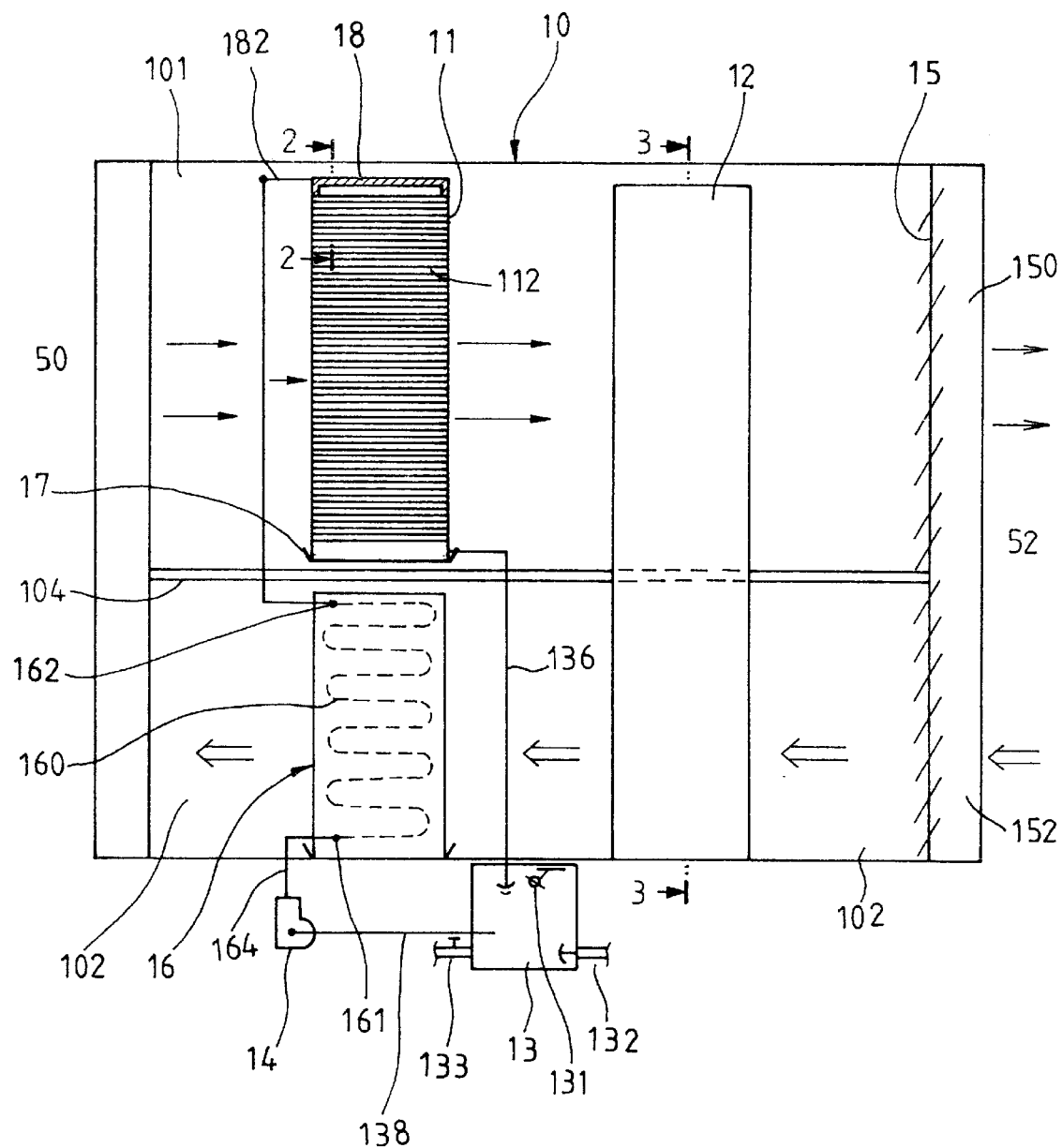
FIG. 1 is a front plan view of a water filtering type air cleaning unit in accordance with the present invention.
Figure 3A:
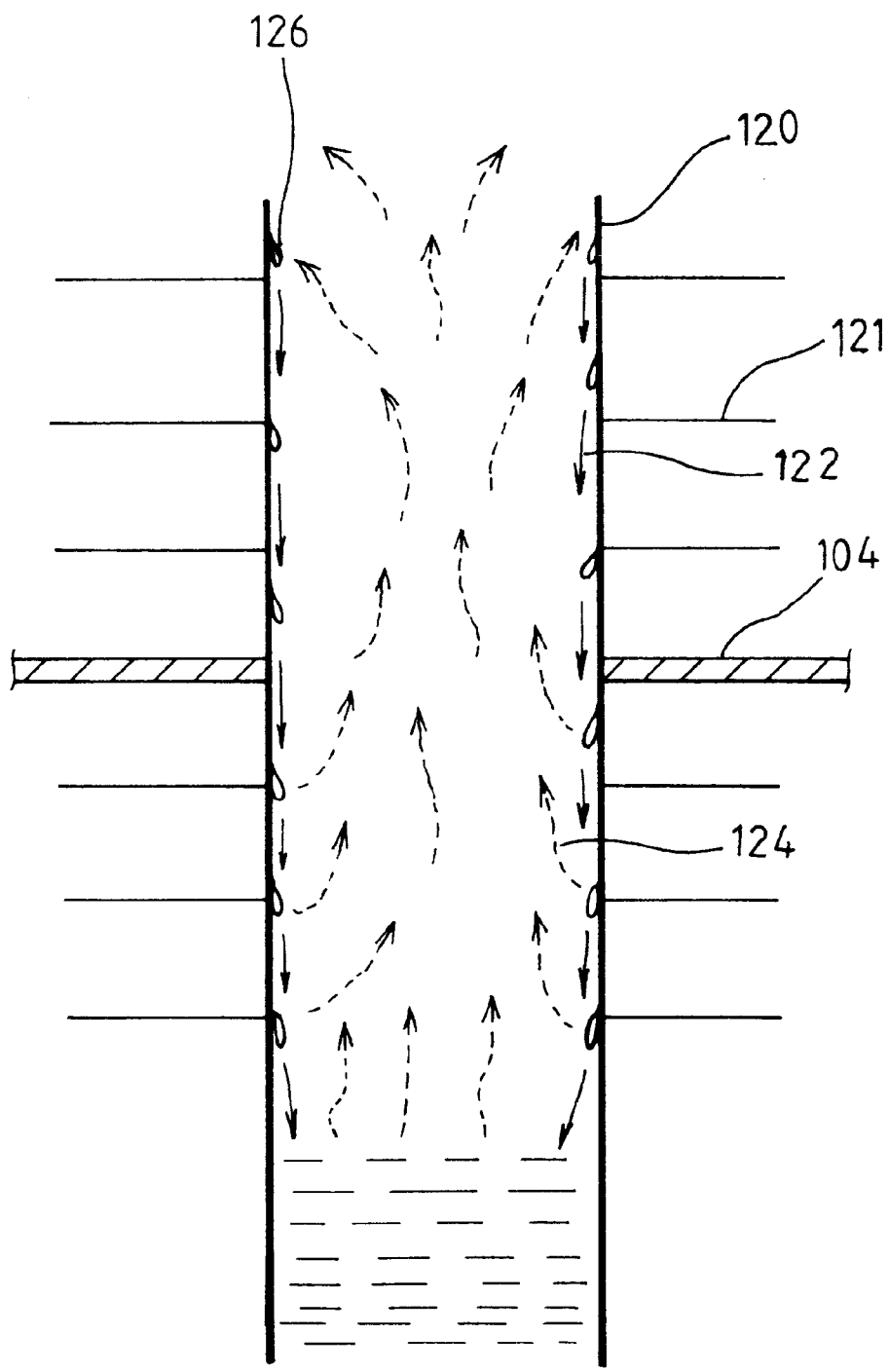
FIG. 3A is an enlarged view of FIG. 3.

Referring now to FIGS. 1—3, a water filtering type air cleaning unit in accordance with the present invention comprises a housing 10 including an upper side defining an air draining conduit 101, a lower side defining an air inlet conduit 102, and a baffle 104 mounted between the air draining conduit 101 and the air inlet conduit 102.

A water permeable air filtering device 11 is mounted in the air draining conduit 101 and includes a plurality of stacked air filtering pipes 112 each of which is made of a tubular filtering material defining a plurality of pores 114. A water permeable disk 18 is mounted on a top edge of the water permeable air filtering device 11 and defines a plurality of small apertures 181 such that water can be evenly distributed through each of the small apertures 181 and is easy to evaporate. A basin 17 is mounted on a bottom portion of the water permeable air filtering device 11.

A cold water heat exchanging device 16 is mounted in the air inlet conduit 102 and includes a cold water inlet 161, a cold water outlet 162 connected with the water permeable disk 18, and a heat exchanging pipe row 160 located between the cold water inlet 161 and the cold water outlet 162. A connecting pipe 182 is connected between the water permeable disk 18 and the cold water outlet 162. A water pump 14 is mounted in the air inlet conduit 102 and connected with the cold water inlet 161 for pumping water into the water permeable disk 18. A connecting pipe 164 is connected between the cold water inlet 161 and the water pump 14. A water tank 13 is mounted in the air inlet conduit 102, connected with the water permeable air filtering device 11 and the water pump 14 and includes a water inlet pipe 132, a water outlet pipe 133 and a float ball 131 for controlling an amount of water in the water tank 13. A connecting pipe 136 is connected between the water permeable air filtering device 11 and the water tank 13, and a connecting pipe 138 is connected between the water pump 14 and the water tank 13.

A natural convention device 12 is mounted in the housing 10 and includes a plurality of closed circulating pipes 120 each mounted with a plurality of fins 121 and each filled with a refrigerant which is easy to evaporate and condense. A vent 15 is mounted in the housing 10 and includes an upper side formed with an air outlet 150 and a lower side formed with an air inlet 152.

In operation, dirty air in the room 50 (or operation space) can be drawn into the water permeable air filtering device 11 via the air draining conduit 101. Water 60 can flow from the water permeable disk 18 into the air filtering pipes 112 via the apertures 181 and into the pores 114 of each of the air filtering pipes 112, thereby forming a compact effect such that the impurities contained in the air can be captured on the air filtering pipes 112 and can be carried by the water 60 to be deposited on the basin 17. In addition, the evaporation effect of the water 60 on the water permeable air filtering device 11 makes the water 60 absorb heat in the air so as to evaporate into vapor 62 such that the temperature of the water 60 can be reduced, thereby providing a function for decreasing the temperature of the air.

The fresh air after being filtered can be drawn into the natural convention device 12. Each of the circulating pipes 120 is filled with a refrigerant which is easy to evaporate and condense, wherein the numeral 122 represents the refrigerant in a liquid state and the numeral 124 represents the refrigerant in a vapor state. The refrigerant located in the upper portion of the natural convention device 12 will condense as shown by numeral 126 in FIG. 3A due to the heat exchanging effect of emitting heat such that the air passing through the upper portion of the natural convention device 12 will absorb heat so as to increase its temperature. Therefore, the air drained from the room 50 can be cleaned, the cold energy can be recovered, the temperature of the air can be increased, and energy can be saved.

The air in the outer surroundings 52 can be drawn into the lower portion of the natural convention device 12 via the air inlet conduit 102. The lower portion of the natural convention device 12 corresponds to the upper portion so as to form a circulating effect such that the air entering the lower portion of the natural convention device 12 from the outer surroundings 52 will emit heat due to the heat exchanging action of the natural convention device 12, thereby decreasing the temperature of the air. The air can then pass through the cold water heat exchanging device 16 where the air will emit heat so as to further decrease its temperature.

The water flows through the water permeable air filtering device 11 from the water permeable disk 18 can be received by the basin 17 which can supply the water into the water tank 13 via the connecting pipe 136. The water inlet pipe 132 of the water tank 13 can be used to supply the water during the circulating process, and the water outlet pipe 133 can be used to drain impurities and excessive circulating water. The water pump 14 can be used to pump water in the water tank 13 into the cold water inlet 161 via the connecting pipe 164, and the water can then be pumped from the cold water outlet 162 into the water permeable disk 18 via the connecting pipe 182, and finally flows through the water permeable air filtering device 11 into the water tank 13, thereby accomplishing the circulating process.

Referring to FIG. 4, a sterilizing device 19 is mounted between the cold water inlet 161 and the water pump 14 for providing the sterilizing purpose.

Figure 5:
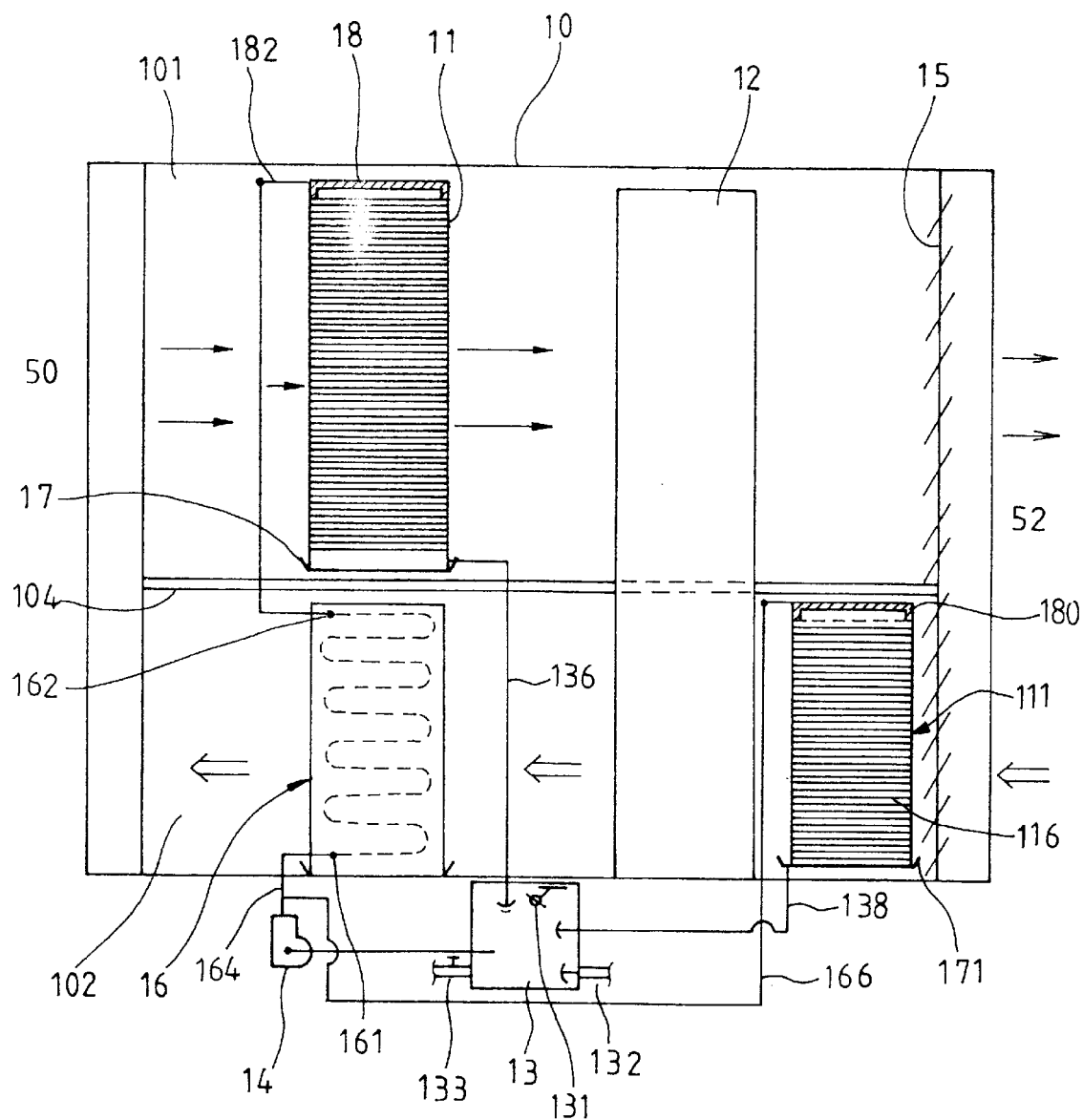
FIG. 5 is a front plan view of a water filtering type air cleaning unit in accordance with a further embodiment of the present invention.

Referring to FIG. 5, a second water permeable air filtering device 111 is mounted between the lower portion of the natural convention device 12 and the vent 15 and includes a plurality of stacked second air filtering pipes 116, a second water permeable disk 180 is mounted on a top edge of the second water permeable air filtering device 111, a connecting pipe 166 is connected between the second water permeable disk 180 and the cold water heat exchanging device 16, a second basin 171 is mounted on a bottom portion of the second water permeable air filtering device 111, and a connecting pipe 138 is connected between the basin 171 and the water tank 13.

Figure 6:
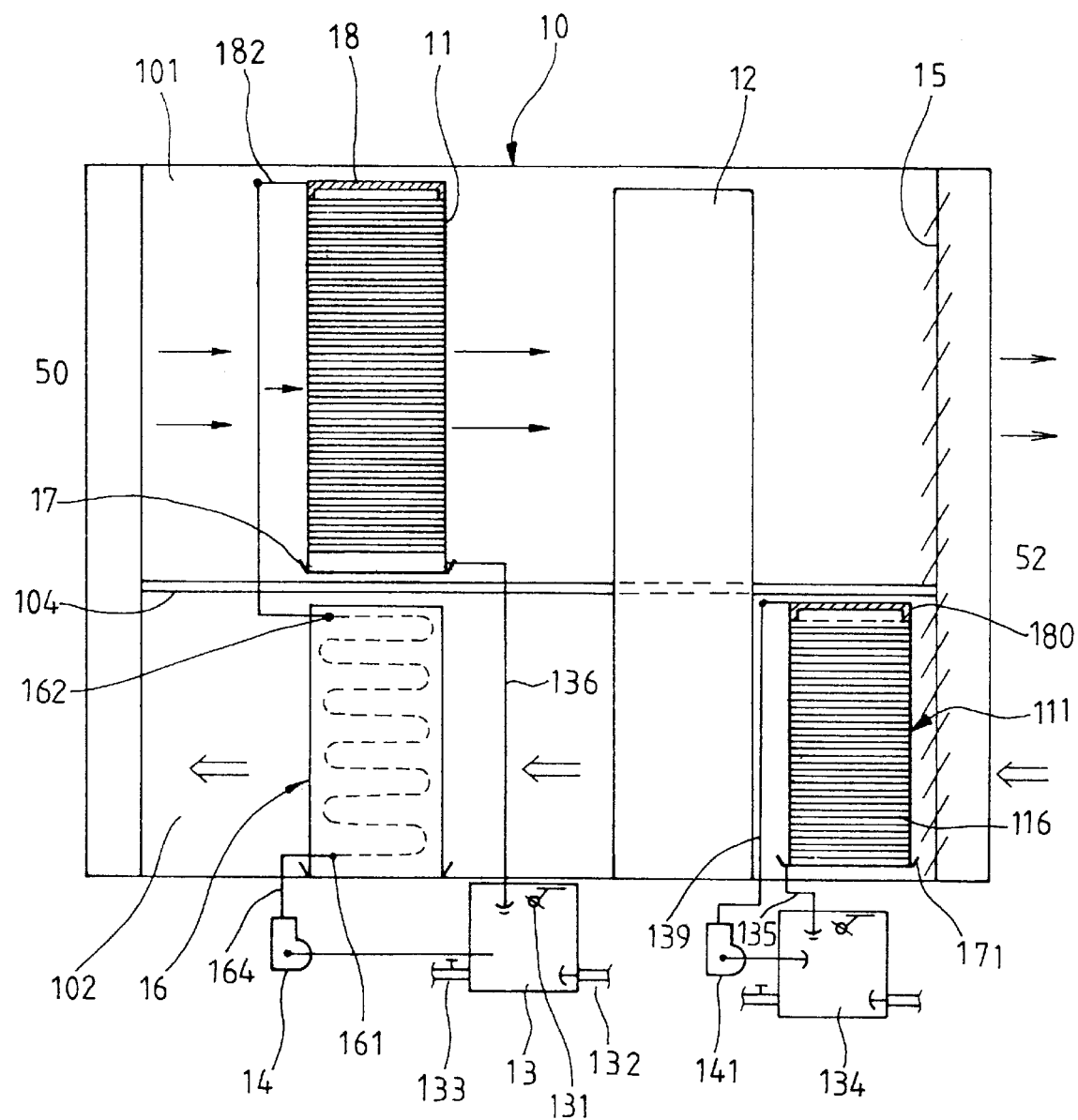
FIG. 6 is a front plan view of a water filtering type air cleaning unit in accordance with a further embodiment of the present invention.

Referring to FIG. 6, a second water tank 134 is connected with the basin 171 of the second water permeable air filtering device 111 via a connecting pipe 135, and is connected with a second water pump 141 which is connected with the second water permeable disk 180 via a connecting pipe 139.

Figure 7:
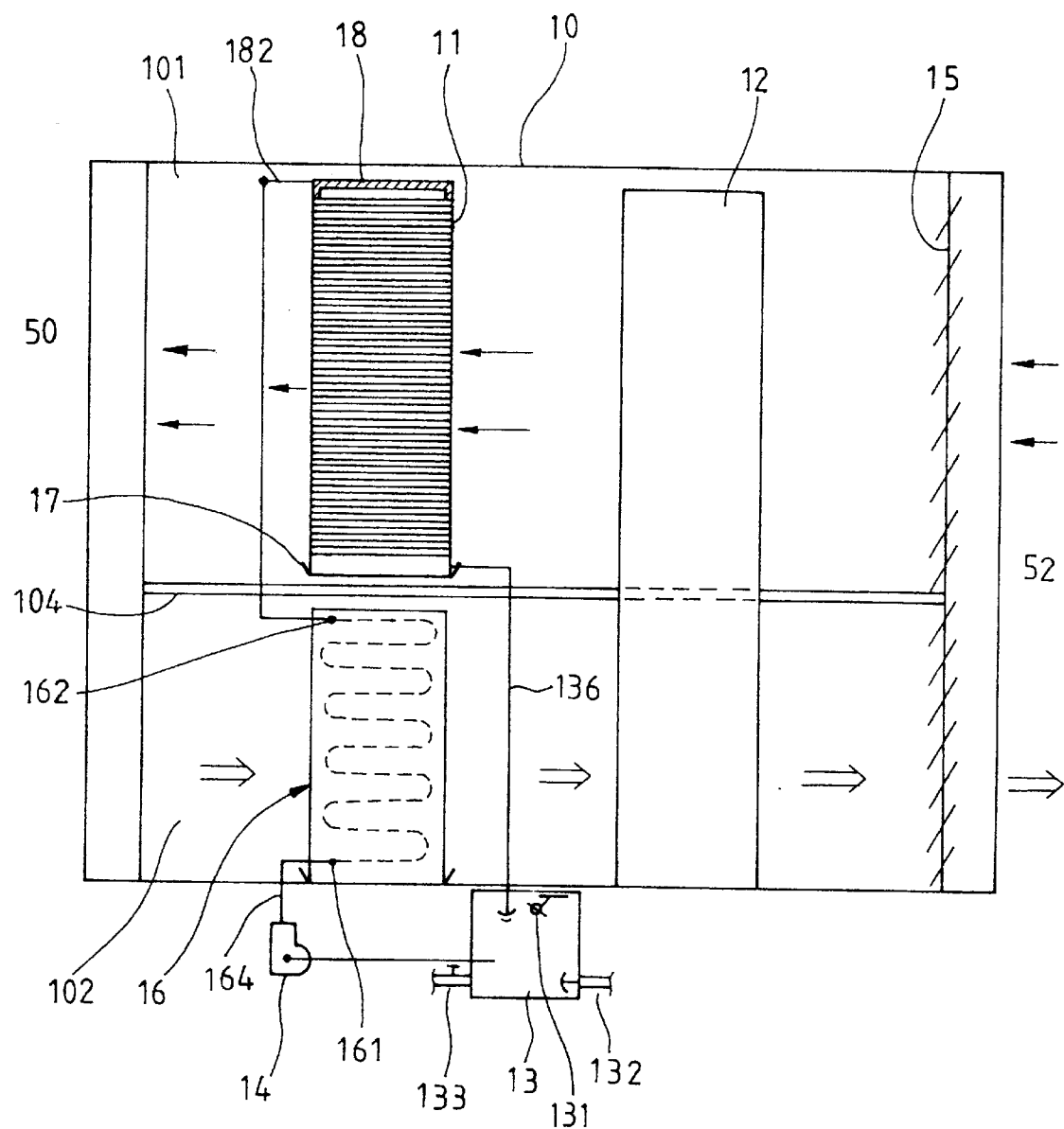
FIG. 7 is a front plan view of a water filtering type air cleaning unit in accordance with a further embodiment of the present invention.

The above-mentioned embodiments can be used to supply cold air to the room 50. Referring now to FIG. 7, when it is intended to supply warm air into the room 50, the moving direction of the air is reverse to that as shown in FIG. 1. The operation thereof is similar to that as shown in FIG. 1, and will not be further described.

Although the present invention has been described with a certain degree of particularity, it is to be understood that the present disclosure has been made by way of example only and that many other possible modifications and variations can be made without departing from the scope and spirit of the present invention.

I claim:

1. A water filtering type air cleaning unit comprising:
   a housing including an upper side defining an air draining conduit and a lower side defining an air inlet conduit;
   a water permeable air filtering device mounted in said air draining conduit and including a plurality of stacked air filtering pipes;
   a water permeable disk mounted on a top edge of said water permeable air filtering device;
   a cold water heat exchanging device mounted in said air inlet conduit and including a cold water inlet and a cold water outlet connected with said water permeable disk;
   a water pump mounted in said air inlet conduit and connected with said cold water inlet;
   a water tank mounted in said air inlet conduit and connected with said water permeable air filtering device and said water pump;
   a natural convention device mounted in said housing and including a plurality of closed circulating pipes each filled with a refrigerant; and
   a vent mounted in said housing and including an upper side formed with an air outlet and a lower side formed with an air inlet.

2. The water filtering type air cleaning unit as claimed in claim 1, wherein each of said air filtering pipes is made of a tubular filtering material defining a plurality of pores.

3. The water filtering type air cleaning unit as claimed in claim 1, wherein said water permeable disk defines a plurality of apertures therein.

4. The water filtering type air cleaning unit as claimed in claim 1, further comprising a connecting pipe connected between said water permeable disk and said cold water outlet.

5. The water filtering type air cleaning unit as claimed in claim 1, further comprising a connecting pipe connected between said cold water inlet and said water pump.

6. The water filtering type air cleaning unit as claimed in claim 1, further comprising a connecting pipe connected between said water permeable air filtering device and said water tank.

7. The water filtering type air cleaning unit as claimed in claim 1, further comprising a connecting pipe connected between said water pump and said water tank.

8. The water filtering type air cleaning unit as claimed in claim 1, wherein said water tank includes a water inlet pipe, a water outlet pipe and a float ball for controlling an amount of water in said water tank.

9. The water filtering type air cleaning unit as claimed in claim 1, further comprising a sterilizing device mounted between said cold water inlet and said water pump.

10. The water filtering type air cleaning unit as claimed in claim 1, further comprising a second water permeable air filtering device mounted between said natural convention device and said vent and including a plurality of stacked second air filtering pipes, a second water permeable disk mounted on a top edge of said second water permeable air filtering device, and a connecting pipe connected between said second water permeable disk and said cold water heat exchanging device.

11. The water filtering type air cleaning unit as claimed in claim 1, further comprising a second water permeable air filtering device mounted between said natural convention device and said vent and including a plurality of stacked second air filtering pipes, a second water permeable disk mounted on a top edge of said second water permeable air filtering device, a second water tank connected with said second water permeable air filtering device, and a second water pump connected with said second water permeable disk and said second water tank.

12. The water filtering type air cleaning unit as claimed in claim 11, further comprising a connecting pipe connected between said second water permeable disk and said second water pump.

* * * * *